US007480620B2

(12) United States Patent
Bennett

(10) Patent No.: US 7,480,620 B2
(45) Date of Patent: Jan. 20, 2009

(54) CHANGING CHARACTERISTICS OF A VOICE USER INTERFACE

(75) Inventor: Steven M. Bennett, Hillsboro, OR (US)

(73) Assignee: Intel Corporation, Santa Clara, CA (US)

( * ) Notice: Subject to any disclaimer, the term of this patent is extended or adjusted under 35 U.S.C. 154(b) by 198 days.

(21) Appl. No.: 11/434,987

(22) Filed: May 15, 2006

(65) Prior Publication Data

US 2006/0265224 A1 Nov. 23, 2006

Related U.S. Application Data

(63) Continuation of application No. 09/675,907, filed on Sep. 29, 2000, now Pat. No. 7,047,197.

(51) Int. Cl.
*G10L 21/00* (2006.01)
(52) U.S. Cl. .................... 704/275; 704/270; 704/270.1; 704/273; 704/246
(58) Field of Classification Search ................. 704/275, 704/270, 270.1, 273, 246
See application file for complete search history.

(56) References Cited

U.S. PATENT DOCUMENTS

| 5,475,792 | A |  | 12/1995 | Stanford et al. |
| 5,717,923 | A |  | 2/1998 | Dedrick |
| 5,897,616 | A |  | 4/1999 | Kanevsky et al. |
| 5,915,001 | A |  | 6/1999 | Uppaluru |
| 5,970,446 | A | * | 10/1999 | Goldberg et al. ............ 704/233 |
| 6,094,476 | A |  | 7/2000 | Hunt et al. |
| 6,324,499 | B1 |  | 11/2001 | Lewis et al. |
| 6,334,103 | B1 |  | 12/2001 | Surace et al. |
| 6,507,818 | B1 |  | 1/2003 | Fishman et al. |
| 6,510,417 | B1 | * | 1/2003 | Woods et al. ............... 704/275 |
| 6,574,601 | B1 | * | 6/2003 | Brown et al. ............. 704/270.1 |
| 6,792,086 | B1 | * | 9/2004 | Saylor et al. ............. 379/88.17 |
| 2002/0035474 | A1 | * | 3/2002 | Alpdemir ..................... 704/270 |

OTHER PUBLICATIONS

VoiceXML Forum, Voice Extensible Markup Language Voice XML, Version 1.9, Aug. 17, 1999, 63 pages.
Tellme,. , Tellme Networks, Inc., 8 pages, 199902000 http://www.tellme.com.
Quack.com, 6 pages, 2000 http://quack.com.
My Yagoo! Yahoo! Inc., 13 pages, 2000 http://my.yahoo.com.

(Continued)

*Primary Examiner*—Richemond Dorvil
*Assistant Examiner*—Qi Han
(74) *Attorney, Agent, or Firm*—D'Ann Naylor Rifai

(57) ABSTRACT

The invention generally relates to a method, apparatus, and system capable of changing a voice user interface possessing both operational characteristics and security characteristics based upon user-specific contextual information. The voice processing system consists of at least the following components: a voice user interface possessing both operational characteristics and security characteristics; a database to store user-specific contextual information; and a computer program to use the user-specific contextual information to dynamically change the operational characteristics of the voice user interface.

6 Claims, 4 Drawing Sheets

OTHER PUBLICATIONS

Sawhney et al: Nomadic Radio: Speech & Audio Interaction for Contextual Messaging in Nomadic Environments; MIT Media Lab, Portions from ISWC '98 & CHI '99 Conf Proceedings, 25 pages.
Patsuris, Forbes.com, Aug. 24, 2000, Copyright 2000 Forbes.com, 728-00eCommerce—The Latest Web Gadget May be the Phone.
Cohen: ZDNet: TellmeNetworks Tellme Full Review from PC Magazine, Jul. 7, 2000 3 pages.
Cohen: ZDNet Quack.com Full Review from PC Magazine Jul. 7, 2000 3 pages.

* cited by examiner

CHANGING CHARACTERISTICS OF A VOICE USER INTERFACE

CROSS-REFERENCE TO RELATED APPLICATIONS

This application is a continuation of U.S. patent application Ser. No. 09/675,907, filed Sep. 29, 2000 now U.S. Pat. No. 7,047,197.

FIELD OF THE INVENTION

This invention generally relates to a voice processing systems. More specifically, the invention relates to using either or both user-specific contextual information and environmental information to make changes in a voice user interface.

BACKGROUND OF THE INVENTION

A voice processing system comprehends human language thereby allowing a user to give commands or make requests to the system by speaking in a human language and having the system respond by voice.

An airline's departure and arrival voice processing system is an example of a rudimentary voice processing system. FIG. 1 illustrates an exemplary static call flow in a voice user interface. Referring to FIG. 1, the user interface illustrated is typical of the kind of static user interface that a user might encounter when using a voice processing system built using previous technology. The user interface welcomes the user and then presents two options to the user. A first voice prompt 102 asks the user to state whether the user's flight is arriving or departing. The user verbally responds by stating whether the flight is arriving or departing. After receiving the user's response, a voice prompt 104 asks the user to state the flight number of interest. The user states the flight number. The system and the user repeat this process to obtain the flight's departure/arrival date 106 and the flight's arrival/departure city 108. Next, the voice processing system repeats the information back to the user to ensure that the system comprehends the user's request. The system then retrieves that particular flight's information from a database 110. Finally, the system communicates the retrieved flight information to the user.

The example voice processing system has a static user interface structure. The system delivers information to the user based on the user's requests or commands, not based on the system possessing knowledge regarding the user. In this example, the voice processing system must complete the full sequence of voice prompts before retrieving the desired information. Thus, the user must take the time to navigate through those successive voice prompts.

This system does not deliver content to the user based on the system having any knowledge about the user. The airline system possesses knowledge about the user's upcoming flight plans, for example, through the user's reservation number or frequent flyer account number. However, the system forces the user to step through the static call flow for each segment of the trip. Thus, if the user has a connecting flight, then the user must give the system the user's information and step through the static call flow again. Additionally, although the airline system possesses knowledge of the user's flight plans, the system does not proactively notify the user of a schedule conflict, such as a flight delay on the second portion of the user's trip, which affects the rest of the user's flight plans.

Users of voice processing systems are mobile. The mobile user may access the voice processing system from many locations such as a moving vehicle, a quiet office, a noisy airport, etc. However, current voice processing systems do not alter their privacy and security requirements or operational characteristics based on environmental characteristics. This is a problem for the mobile user who accesses the system from a variety of devices and in a variety of circumstances. In these situations, the behavior of the system should change to be more useful, understandable, private and secure.

Some voice processing systems allow limited customization of the structure of the voice user interface and the content that is delivered to the user. However, after the user interface and content is customized, then the user interface and content that the user interface delivers remains static. Users may be forced to skim through excessive amounts of non-pertinent information before hearing the information most important to them. When the system forces the user to skim through non-pertinent information, then two problems arise: 1) the user remains connected to the system longer, thereby, tying up more system resources; and 2) the user becomes frustrated with the system.

The invention provides a solution to some of these disadvantages that exist with these current systems.

BRIEF DESCRIPTION OF THE DRAWINGS

The drawings refer to the invention in which.

Figure 1:
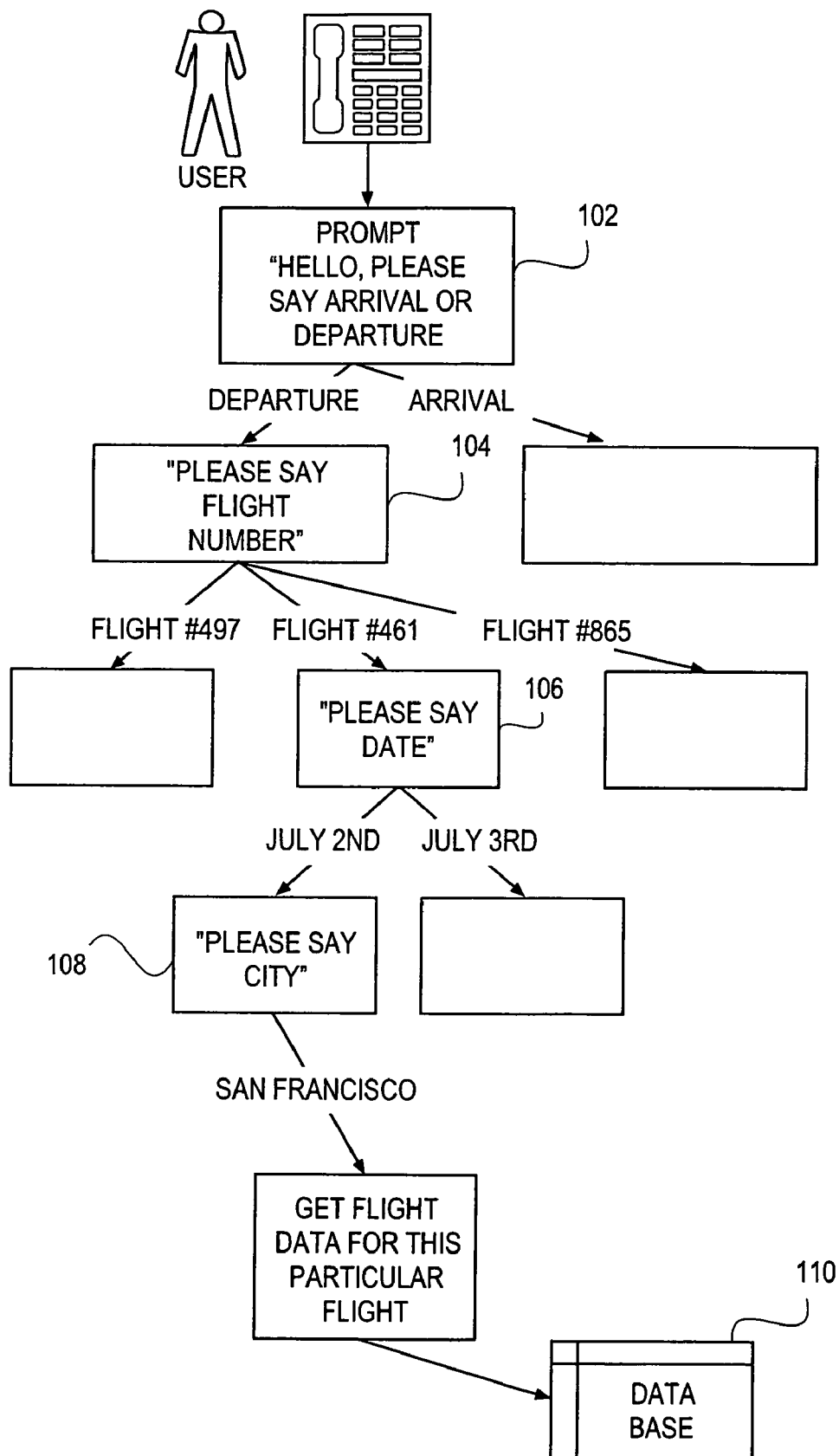
FIG. 1 illustrates an exemplary static call-flow in a voice user interface.

While the invention is subject to various modifications and alternative forms, specific embodiments thereof have been shown by way of example in the drawings and will herein be described in detail. The invention should be understood to not be limited to the particular forms disclosed, but on the contrary, the intention is to cover all modifications, equivalents, and alternatives falling within the spirit and scope of the invention as defined by the appended claims.

DETAILED DISCUSSION

A voice processing system comprehends human language thereby allowing a user to give commands or make requests to the system by speaking in a human language and having the system respond. The discussion below centers primarily around voice processing systems which are telephony-based; that is, the user interacts with the system over a telephone connection using his voice. We note, however, that the invention described here is not limited to telephony systems, but in fact includes all voice processing systems regardless of the type of communication device 202 or transmitive network 204 involved.

The voice user interface is a means by which a user and the system interact, typically, using speech or other audio tones as the communication method. In the telephony environment, this is sometimes referred to as a call-flow.

Content is information that is potentially of interest to a user. Content may be communicated to a user either because the user requests the information or because the system intelligently chooses to present the information to the user. For example, if the system is aware of the user's itinerary and that the user's airplane flight has just been canceled, then the system may choose to present to the user the content that the flight is canceled and the flight times associated with alternative flights. On the contrary, the system would not chose to deliver the content of alternative flight times to other users who are not scheduled to be on the canceled flight.

User-specific contextual information is information that the system knows about a particular user such as the user's identity, current location, current task, calendar, schedule, or other similar information.

A communication device 202 is a device such as a cell phone, a land-line phone, a speakerphone, a wireless headset, or other similar device capable of transmitting a human's voice.

The term audio scene refers to the ambient sound environment at the location of the user. Example audio scenes are a moving vehicle, a quiet office cubicle, or an airport with a noisy background filled with various human voices and non-speech sounds. Environmental information is information such as details of the user's chosen communication device 202, details of the communication channel, or audio scene information.

When interacting with a voice-automated system, the user may interrupt the system when the system is speaking to the user. This is referred to as a barge-in. When the user barges-in on the system, the system cuts off the system's output midstream. Typically, a user initiated barge-in expedites the user's capability to get to pertinent information in a more timely manner. However, extraneous background noise may cause a false barge-in when the noise level becomes high enough. Sources of this noise include public address announcements, a car horn blowing, a user's cough or rough handling of the phone. A false barge-in may cut off the pertinent information that the user wants to hear. The false barge-in forces the user to request that the system repeat the information. A false barge-in lengthens the call and increases the frustration level of the user. Additionally, the user may become confused. All these factors from a false barge-in directly impact the cost of providing the service. Heterogeneous information is data that is not all the same type. In an embodiment of the invention, the heterogeneous information sources include the user's e-mail, voice mail, calendar, schedule, flight information, weather information, traffic information, hotel information, rental car information, sports, stocks, news, personal information manager (PIM) information (contacts, tasks), as well as particular categories of interest selected by the user.

Figure 2:
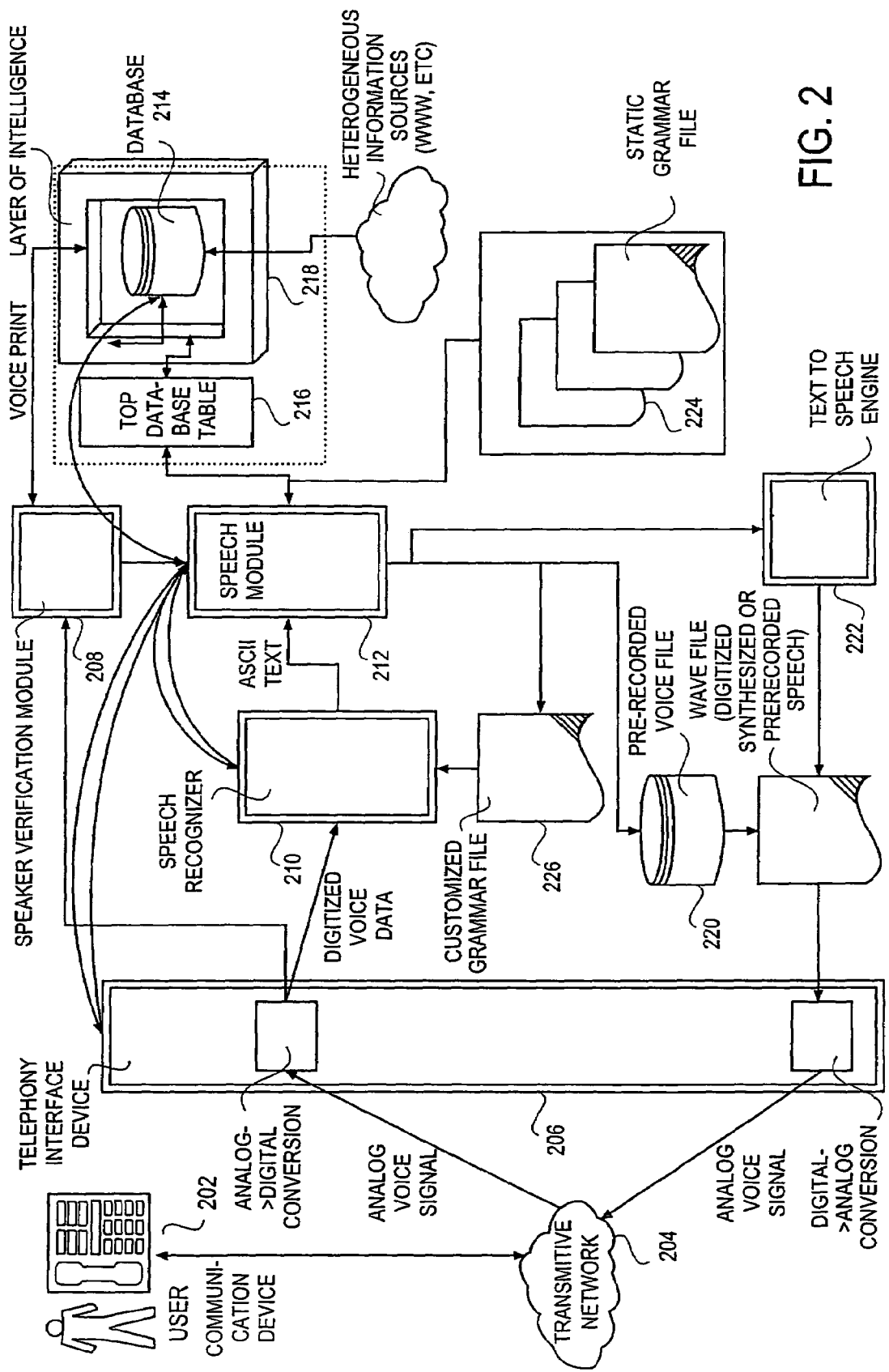
FIG. 2 illustrates an embodiment of a system which dynamically changes the voice user interface of the system and content communicated to the user based upon either or both user-specific contextual information and the environmental information.

Referring to FIG. 2, FIG. 2 illustrates an embodiment of a system that dynamically changes the voice user interface of the system and content communicated to the user based upon either or both user-specific contextual information and environmental information. A user interacts with the system through a communication device 202. The user's analog or digital voice signal travels to the system across the corresponding transmitive network 204, such as a Public Switched Telephone Network, a satellite network, or other similar network. The transmitive network 204 may carry analog or digital signals. The system receives the user's voice signal at a device such as a telephony interface device 206. If necessary, the telephony interface device 206 converts the user's analog voice signal into a stream of digitized voice data. This digital voice data is sent to the speaker verification module 208 and the speech recognizer 210. The telephony interface device 206 acts as a call control center by detecting that an incoming phone call has been received. The telephony interface device 206 then communicates that an incoming phone call is occurring to the speech module 212. The telephony interface device 206 takes the incoming line off-hook, i.e. the telephony interface device 206 answers the phone. The telephony interface device 206 accepts digital audio signals from either the text to speech engine 222 or the pre-recorded voice file 220. The telephony interface device 206 converts the digital signal to analog, if necessary. The digital data to be transmitted may be in a variety of forms, such as wave, MP3, raw audio files or some other digital form. The speech module 212 may direct a pre-recorded voice file 220 to the telephony interface device 206, which in turn transmits the pre-recorded voice file 220 onto the transmitive network 204. In this instance, the pre-recorded voice file 220 might answer the phone by saying "Welcome to the System, what can I do for you?"

Each different type of communication device 202 possesses unique audio characteristics, i.e. channel characteristics, that differ significantly. The telephony interface device 206 may characterize channel characteristics of each communication device 202 and communicate the channel characteristics information to the speech module 212. The speech module 212 compares these characteristics to the channel characteristics of classes of devices stored in the database 214. With this method, the speech module 212 estimates the type of communication device 202 that the user is using to communicate with the system. For example, the speech module 212 may estimate that the user is calling from a speakerphone, or that the user is calling from a cell phone. In an alternate embodiment, the user may verbally tell the system the type of communication device 202 that the user is using to communicate with the system. Additionally, the speech module 212 may use the phone number assigned to the communication device 202 or caller id information of the communication device 202 to cross reference information stored in the database 214 to aid in determining details of the communication device 202. If this method can be used because the caller id information is available and the database has information on the device associated with this number, then this method has been found to be highly accurate.

The telephony interface device 206 or speech recognizer 210 may also estimate the audio scene characteristics associated with user's current location. In an alternative embodiment, the speech recognizer 210 estimates the audio scene characteristics associated with user's current location. The telephony interface device 206 or speech recognizer 210 sends the audio scene information to the speech module 212. The speech module 212 compares these characteristics to the channel characteristics of classes of audio scenes stored in the database 214. In alternative embodiments, the user may tell the system the type of audio scene environment that the user is located within. Additionally, the speech module 212 may use the phone number of the communication device 202 or caller id information to cross reference information stored in the database 214 to aid in determining the audio scene information. If this method can be used because either the caller id information is available and the database has information on the associated device, or the location of the device is fixed and the database has information on the associated location, then this method has been found to be highly accurate.

The telephony interface device 206 detects the sound level of the user's voice at the board's input. If the telephony interface device 206 detects a sound above the barge-in level, then the board stops generating sound at the board's output. Outbound sound degrades the quality of the incoming sound due to echo paths in the transmission lines. By cutting off the output, the speech recognizer 210 can do a better job of recognizing the sounds that the system is receiving at the input.

The speech module 212 may set the barge-in threshold through an Application Program Interface (API) in the telephony interface device 206 or an API in the speech recognizer 210. The speech module 212 may use the acquired environmental information as well as user-specific contextual information to determine the appropriate barge-in level. By appropriately setting the barge-in level, the system reduces false barge-in occurrences.

When signaled by the layer of intelligence 218, the speech module 212 references the database 214 and sends a notification to the user by directly phoning the user. The layer of intelligence 218 sends this notification command if the layer of intelligence 218 recognizes that a high priority item from the top database table 216 requires the user's immediate attention. In one embodiment, the layer of intelligence 218 starts with the least intrusive method and upon not receiving a user response in a specified period of time, then the layer of intelligence 218 escalates the intrusiveness of the notification method. Example notification methods include, but are not limited to, sending the user an e-mail, sending SMS messages to the user's cell phone, sending pages to the user, and placing a voice call to the user on his cell phone, office phone, home phone, etc.

The speech recognizer 210 receives the stream of digitized voice data from the telephony interface device 206. The speech recognizer 210 conducts digital signal processing on the incoming user's voice signal for comparison to a language module in order to send American Standard Code for Information Interchange (ASCII) text (or some other text format) to the speech module 212. The speech recognizer 210 can access multiple language modules such as an American English module or a Japanese language group. Part of the language module is a grammar file supplied by the speech module 212. The speech recognizer 210 compares groups of successive phonemes to an internal database of known words and the expected responses in the grammar file. The speech recognizer 210 sends text corresponding to the particular response in the dynamically generated grammar file to the speech module 212. A portion of the speech recognizer 210 contains adaptive filters that attempt to model and then nullify the communication channel and audio scene noise that is present in the digitized speech signal.

The speech module 212 generates the grammar file sent to the speech recognizer 210. This grammar file contains anticipated responses based on the prompted options made available to the user and/or statistically frequent responses. The user-specific contextual information is used in determining the form of this grammar file. Some interactions, such as delivery of information like news, weather, and e-mail, require only static grammar files because user responses/requests are known a priori. For example, the user might say "Read the item," "Delete the item," or "Skip the item." However, in more complex interactions, such as dealing with a flight cancellation, the range of possible user responses are situation dependent requiring the speech module 212 to create a customized grammar file 226.

The speaker verification module 208 receives the stream of digitized voice data from the telephony interface device 206. The speaker verification module 208 performs a biometric analysis of the user's voice to authenticate and verify the identity of the user. In response to a prompt, the user states his or her identity. The speech recognizer 210 communicates the user's stated identity to the speech module 212. The database 214 provides the speaker verification module 208 with the necessary voice print to verify that the user is whom the user claims to be. The speaker verification module 208 performs this verification by comparing the characteristics of the user's voice coming from the telephony interface device 206 to this voice print. After analyzing the comparison, the speaker verification module 208 determines a confidence level in the authenticity of the identity of the user. If this confidence level is above a certain threshold, which is set by the speech module 212, then the identity of the user is confirmed. After the speaker verification module 208 confirms the identity of the user, the speaker verification module 208 communicates to the speech module 212 that the user's identity has been properly verified.

As another aspect of the security characteristics of the voice user interface, information items in the database 214 are marked with a privacy level and a security level. The speech module 212 determines a security and privacy rating for a communication to a user based upon the user's environmental information. For example, if access to a communication device 202 is limited either physically or through a local authentication mechanism such as a Personal Identification Number to access a cell phone, then the communication device 202 will be assigned a high level of security. Communications from the user's office phone are likewise assigned a higher level of security than a public pay phone, for example. If the user is using a communication device 202 with a low level of security, then the speech module 212 changes the voice user interface by adding extra authentication steps. For example, the user is calling from a public pay phone, then the voice user interface may add an extra authentication step such as, "Please state your mother's maiden name." The user is expected to say his mother's maiden name. The user's response will be verified against data in the database 214 and possibly by the speaker verification module 208. In an embodiment, the speech module 212 assumes a high level of security only requiring a user to state the user's name and satisfy a voice print analysis. By default, the speech module 212 eliminates extra steps in the voice user interface and shortens call times whenever possible.

The speech module 212 may change the speaker verification confidence threshold based on channel characteristics. If the communication channel is noisy or in some other way impairs the performance of the speaker verification module 208, then the speech module 212 may lower the threshold level and add extra authentication steps to the voice user interface as described above. For example, an analog cell phone connection often possesses a noisy communication channel. If the user is communicating to the system through a communication channel or communication device 202 that has a low privacy rating (for example, a speaker phone or an analog cell phone connection, both of which are subject to eavesdropping), then the speech module 212 may ask the user if sensitive information assigned a high privacy rating should be delivered at this time.

The speech module 212 receives text representing the user's voice communication to determine what grammar file and system prompts should be dynamically generated. Additionally, the speech module 212 analyzes the content of text from the speech recognizer 210 in order to send a request to the database 214 to retrieve the information that the user is seeking. When the speech module 212 receives the desired information, then the speech module 212 communicates the information to the user by sending to the telephone interface device 206 either a pre-recorded voice file 220, or a dynamically generated computer voice message created by the text to speech engine 222 or some combination thereof.

Data from various heterogeneous information sources is placed in the database 214. The layer of intelligence 218 assigns a priority level to each piece of information based upon the user-specific contextual information. The layer of intelligence 218 orders items of interest to a particular user from the database 214 into the top database table 216 based on the priority level determined above. The layer of intelligence 218 dynamically organizes the order in which the information items from the database 214 are presented to the user by placing the information items in priority order in the top database table 216.

For example, a meeting at 2:00 p.m. at the client's headquarters exists on the user's PIM calendar. The driving directions from the user's last known location, the user's office, to the client's headquarters suggest driving on highway 101. The monitored traffic news reports an accident on highway 101 increasing the travel time by 20 minutes. The system may then raise the priority level of the traffic delay information and the potential schedule conflict information so that the system communicates this information to the user immediately after the user identifies himself. Additionally, if based upon the user-specific contextual information, for example the user is scheduled to be in a meeting until 1:30 p.m., this newly acquired information causes a conflict, then the layer of intelligence 218 may increase the item's priority level and signal the speech module 212 to send a notification to the user by using the telephony interface device 206.

The layer of intelligence 218 assigns a sensitivity and security level to the items in the database 214. Information items that are confidential or personal in nature, for example, a message from a spouse or an email marked "confidential", may be marked at higher sensitivity levels, meaning that the user may not want others to hear them. The security level is used so that content providers may stipulate the delivery mechanisms that are acceptable to them. For example, a corporate email system may let the user set an outgoing email to a high security level. The high security level indicates to the voice processing system that the item should not be delivered over less-secure delivery channels.

Figure 3:
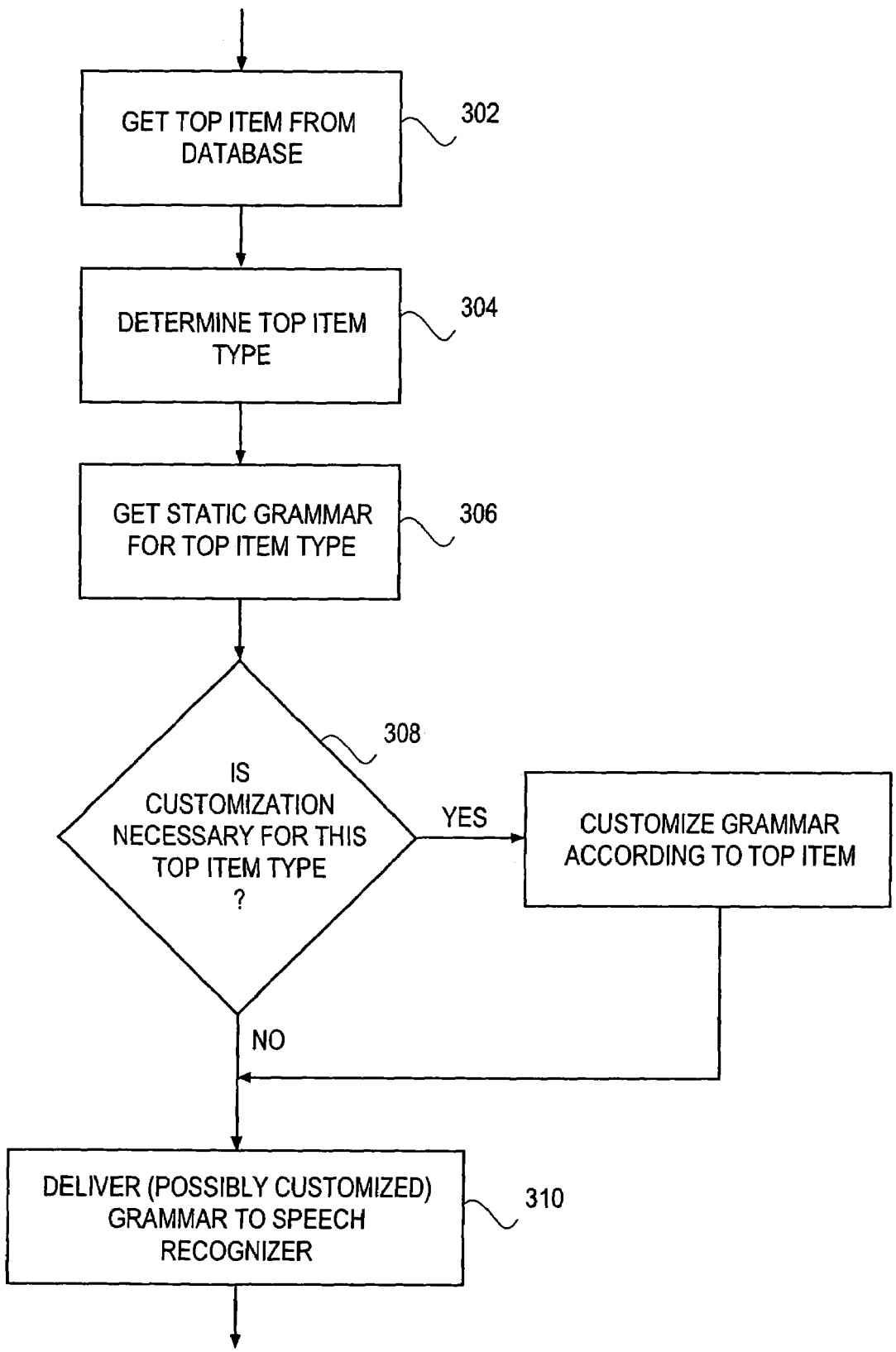
FIG. 3 illustrates a flow chart of how the speech module generates a grammar file for an information item in the top database table.

FIG. 3 illustrates a flow chart of how the speech module 212 generates a grammar file for an information item in the top database table 216. In step 302, the speech module 212 calls for the first item of information in the top database table 216. In step 304, the speech module 212 determines the type of the information item such as a news article, schedule reminder, or flight cancellation. The speech module 212 also examines the priority level assigned to that item and any sensitivity level assigned to that item. If the communication device 202 is a low privacy device such as a speakerphone and the sensitivity of the item is high enough, then the speech module 212 may add a prompt to the voice user interface asking the user if it is okay to send the sensitive information at this time. In step 306, the speech module 212 retrieves the static grammar file 224 for that item type. In step 308, if the speech module determines grammar customization is required, then the speech module 212 performs the customization creating a customized grammar file 226. In step 310, the speech module 212 delivers the (possibly customized) grammar file to the speech recognizer 210. The speech recognizer 210 uses the grammar file to increase the system's overall speech recognition and comprehension of the user's actual request/response.

The speech module 212 dynamically determines the call flow of the voice user interface. This dynamic determination is based on factors such as the priority level of the data, the user's location and communication device, the sensitivity level of the data, the current task the user is engaged in, and other factors particular to the user that the system monitors. The speech module 212 may change the voice user interface from a passive posture of simply responding to the user's requests to an active posture of notifying the user of information from the top database table 216 assigned a high enough priority.

Figure 4:
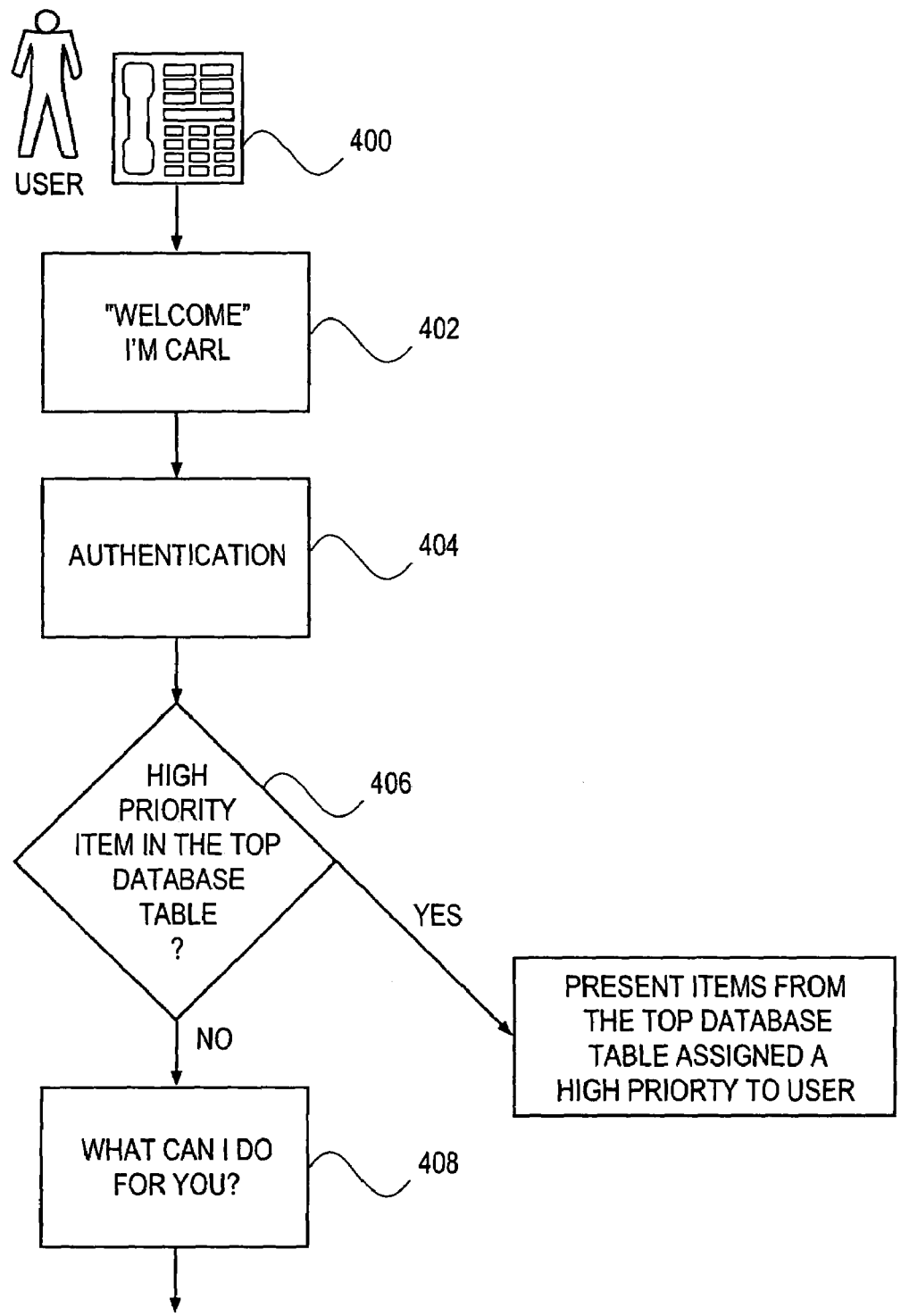
FIG. 4 illustrates a flow chart of a dynamically generated call-flow in the voice user interface.

FIG. 4 illustrates a flow chart of a dynamically generated call-flow in the voice user interface. In step 400, Carl, the user, connects to the system through his office phone. In step 402, a prompt welcomes the user. After the prompt, Carl identifies himself. In step 404, the speaker verification module 208 and speech module 212 authenticate Carl's identity. Additionally, the system determines the user's environmental information. In step 406, the speech module 212 proactively presents to Carl items from the top database table 216 assigned a high enough priority that require Carl's urgent attention. In step 408, if no such high priority items exist, then the voice user interface passively prompts Carl, "What can I do for you?"

Thus, based on user-specific contextual information, environmental information, the sensitivity of the information being communicated to the user, and/or the priority level assigned to the information being communicated to the user, the speech module 212 changes the structure of the voice user interface by: eliminating authentication steps; eliminating non-relevant call-flow steps for items in the top database table 216; changing the voice user interface from passively responding to a user's request to proactively alerting the user to information assigned a high priority level; and changing the order in which information is delivered, even across information types (for example, interleaving email, calendar and stock information) without forcing the user to navigate a series of menus to reach these heterogeneous pieces of information.

A further example illustrates the speech module 212 changing the voice user interface to eliminate non-relevant steps based upon the system's knowledge of the user-specific contextual information follows. In this example, Carl connects with a cellular phone to the system and requests the system to give him directions from the airport to his hotel:

System: Welcome to the System. What can I do for you?
Carl: It is Carl Weathersby.
System: Hi Carl. To verify your identity, please say "Mice like green cheese".
Carl: Mice like green cheese.
System: Thank you. No urgent items need attention. What can I do for you?
Carl: I need directions to the hotel.
System: One moment . . . Before we begin, you will need $1.25 for a toll during the trip. You may want to have it handy. The directions to the Montgomery Hotel are as follows. Follow the signs out of the airport and tell me when you are nearing the exit out of the airport if I don't speak first.
A moment later
Carl: I am there.
System: Make a left onto highway 1a, heading west toward Boston. Stay on 1a for 12 miles. Tell me when you pass exit 11 if I don't speak first.
15 minutes later . . .
System: Carl, you are nearing exit 11. You are about to enter the Summer Tunnel. The toll is $1.25. We will lose this cellular connection while you are in the tunnel. Please call back on the other side.
Carl: Goodbye.
After the tunnel
System: Welcome to the System. What can I do for you?
Carl: It is Carl Weathersby.

System: Hi Carl. Please take exit 11, Commercial Street...
Head north on Commercial Street for 2 miles...

When Carl calls back after exiting the tunnel, voice user interface did not force Carl to go through the same authentication steps and the system jumped directly back into the task which was interrupted by the tunnel. The speech module 212 dynamically generated the structure and content of the voice interface based on the user context (in this case, knowledge of Carl's location, current task and prior activity). Additionally, the system was either told or anticipated Carl's context and appropriately increases the priority level of several information items. The increase in the priority level of these information items, such as the toll information, cellular connection information, and anticipatory traffic interchange information, causes the voice user interface to communicate these items without Carl requesting them. Furthermore, the speech module 212 accesses the database 214 to cross reference Carl's generic request for directions to the hotel to Carl's itinerary stored in the database 214. The speech module 212 accesses the database 214 for information known about the user in order to give Carl proper directions to the Montgomery hotel rather than forcing the voice user interface to create a prompts asking Carl, "Directions to what hotel?" and "Where are you now?".

In an embodiment, a computer program directs and controls the operation of the voice user interface. This program can be embodied onto a machine-readable medium. A machine-readable medium includes any mechanism that provides (i.e., stores and/or transmits) information in a form readable by a machine (e.g., a computer). For example, a machine-readable medium includes read only memory (ROM); random access memory (RAM); magnetic disk storage media; optical storage media; flash memory devices; electrical, optical, acoustical or other form of propagated signals (e.g., carrier waves, infrared signals, digital signals, etc.); etc.

Most functions performed by electronic hardware components may be duplicated by software emulation. Similarly, processing capability of a central processing unit (CPU) or digital signal processor (DSP) on any board or device may be transported to a CPU or DSP located on any board or device. For example, in an alternative embodiment the processing of information that occurs in the layer of intelligence 218 could be transported to the speech module 212. Additionally, the telephony interface 206, speech recognizer 210 or another component may determine the type of communication device 202 without involving the speech module 212 or the database 214. Furthermore in an alternative embodiment, the speech recognizer 210 detects and communicates the audio scene and channel characteristics signal to the speech module 212. Therefore, a person skilled in the art will appreciate that various deviations from the described embodiments of the invention are possible and that many modifications and improvements may be made within the scope and spirit thereof. The invention is to be understood as not limited by the specific embodiments described herein, but only by scope of the appended claims.

I claim:

1. A method for obtaining information, comprising:
    enabling a user to connect to a voice processing system and provide identification;
    authenticating the identification of the user;
    determining environmental information of the user;
    proactively presenting, to the user, items from a top database table assigned a high enough priority to require urgent attention from the user if any of the items need urgent attention;
    passively interacting with the user to provide the user with information requested by the user; and
    generating customized grammar by:
        retrieving an item of information in the top database table;
        determining a type of information for the retrieved item, a priority level assigned to the retrieved item, and a sensitivity level assigned to the retrieved item;
        determining whether the sensitivity level requires additional prompts;
        retrieving a static grammar file representative of the type of information for the retrieved item; and
        if it is determined that grammar customization is required, creating a customized grammar file.

2. The method of claim 1, wherein passively interacting with the user comprises using a grammar file to provide the user with information requested by the user, wherein the grammar file comprises a file from the group consisting of:
    the static grammar file; and
    the customized grammar file.

3. The method of claim 1, wherein if a sound level of the user's voice is above a barge-in threshold level, stopping generation of sound to enable better recognition of the sound that is being received by the system.

4. An article comprising:
    a storage medium having a plurality of machine accessible instructions, wherein when the instructions are executed by a processor, the instructions provide for
    enabling a user to connect to a voice processing system and provide identification;
    authenticating the identification of the user;
    determining environmental information of the user;
    proactively presenting, to the user, items from a top database table assigned a high enough priority to require urgent attention from the user if any of the items need urgent attention;
    passively interacting with the user to provide the user with information requested by the user; and
    generating customized grammar by:
        retrieving an item of information in the top database table;
        determining a type of information for the retrieved item, a priority level assigned to the retrieved item, and a sensitivity level assigned to the retrieved item;
        determining whether the sensitivity level requires additional prompts;
        retrieving a static grammar file representative of the type of information for the retrieved item; and
        if it is determined that grammar customization is required, creating a customized grammar file.

5. The article of claim 4, wherein passively interacting with the user comprises using a grammar file to provide the user with information requested by the user, wherein the grammar file comprises a file from the group consisting of:
    the static grammar file; and
    the customized grammar file.

6. The article of claim 4, wherein the instructions, when executed by a processor, further provide for:
    if a sound level of the user's voice is above a barge-in threshold level, stopping generation of sound to enable better recognition of the sound that is being received by the system.

* * * * *